(12) United States Patent
Maliverney

(10) Patent No.: US 10,738,217 B2
(45) Date of Patent: Aug. 11, 2020

(54) METHOD FOR PRODUCING ORGANOPOLYSILOXANES WITH (METH)ACRYLATE FUNCTIONS

(71) Applicant: Bluestar Silicones France SAS, Lyons (FR)

(72) Inventor: Christian Maliverney, Saint Julien sur Bibost (FR)

(73) Assignee: Elkem Silicones France SAS, Lyons (FR)

( * ) Notice: Subject to any disclaimer, the term of this patent is extended or adjusted under 35 U.S.C. 154(b) by 0 days.

(21) Appl. No.: 15/741,575

(22) PCT Filed: Jul. 5, 2016

(86) PCT No.: PCT/FR2016/000114
§ 371 (c)(1),
(2) Date: Jan. 3, 2018

(87) PCT Pub. No.: WO2017/005993
PCT Pub. Date: Jan. 12, 2017

(65) Prior Publication Data
US 2018/0201806 A1 Jul. 19, 2018

(30) Foreign Application Priority Data
Jul. 6, 2015 (FR) .................................... 15 01425

(51) Int. Cl.
| | |
|---|---|
| *B05D 3/06* | (2006.01) |
| *C09D 183/06* | (2006.01) |
| *C08G 77/20* | (2006.01) |
| *C08G 77/38* | (2006.01) |
| *C08J 7/04* | (2020.01) |
| *C08G 77/00* | (2006.01) |

(52) U.S. Cl.
CPC ........... *C09D 183/06* (2013.01); *B05D 3/067* (2013.01); *C08G 77/20* (2013.01); *C08G 77/38* (2013.01); *C08J 7/0427* (2020.01); *C08G 77/70* (2013.01); *C08J 2367/02* (2013.01); *C08J 2483/06* (2013.01)

(58) Field of Classification Search
CPC ................................. C09D 183/06; B05D 1/00
See application file for complete search history.

(56) References Cited

U.S. PATENT DOCUMENTS

| | | | |
|---|---|---|---|
| 4,324,873 A | 4/1982 | Wada et al. | |
| 4,777,233 A | 10/1988 | Suzuki et al. | |
| 4,978,726 A * | 12/1990 | Dohler | C08G 77/38 |
| | | | 525/479 |
| 2001/0056157 A1 | 12/2001 | Terry et al. | |
| 2012/0172472 A1* | 7/2012 | Maliverney | B01J 31/2234 |
| | | | 521/134 |

FOREIGN PATENT DOCUMENTS

EP 2574638 A1 4/2013

OTHER PUBLICATIONS

PCT International Search Report for PCT/FR2016/000114, dated Sep. 5, 2016.

* cited by examiner

*Primary Examiner* — Dah-Wei D. Yuan
*Assistant Examiner* — Kristen A Dagenais-Englehart
(74) *Attorney, Agent, or Firm* — McBee Moore & Vanik IP, LLC

(57) ABSTRACT

There is provided a process for producing an organopolysiloxane A comprising at least one (meth)acrylate group, said process comprising the following steps:
a) the following are reacted at a temperature of between 50 and 140° C., optionally between 70 and 130° C.:
at least one organopolysiloxane B comprising at least one epoxy group,
with acrylic acid or methacrylic acid or a mixture of the two,
in the presence of a catalyst C which is a complex of iron in the oxidation state (III), of formula (1) below:

$$[Fe(L^1)_3] \quad (1)$$

in which the symbols $L^1$, which may be identical or different, represent a ligand chosen from the group made up of: a β-dicarbonylato anion or the enolate anion of a β-dicarbonyl compound, a carboxylate anion and an alkoxide anion, and
of at least one solvent, and
b) the product obtained, which is said organopolysiloxane A or a mixture containing predominantly said organopolysiloxane A, is isolated.

16 Claims, No Drawings

METHOD FOR PRODUCING ORGANOPOLYSILOXANES WITH (METH)ACRYLATE FUNCTIONS

CROSS-REFERENCE TO RELATED APPLICATIONS

This application is a National Stage entry of International Application No. PCT/FR2016/000114, filed Jul. 5, 2016, which claims priority to French Patent Application No. 1501425, filed Jul. 6, 2015.

BACKGROUND

The present invention relates to a process for preparing organopolysiloxanes functionalized with (meth)acrylate groups, preferably acrylate groups. For the entire document, it should be understood that (meth)acrylate groups comprise acrylate groups, methacrylate groups or a mixture of the two.

Description of Related Art

These (meth)acrylate functionalities are present in hydrocarbon-based radicals bonded to the polysiloxane chain by an Si—C bond which may be present in the chain or at the chain end. These (meth)acrylic acid ester functions are capable of reacting via the radical process under actinic and/or thermal activation according to a polyaddition polymerization mechanism.

These organopolysiloxanes comprising a (meth)acrylate function are widely used in radical-crosslinkable silicone compositions to produce an elastomer, which can be optionally coated in a thin layer on a flexible support which is made of textile, of paper, of polyvinyl chloride (PVC), of polyester, of polypropylene, of polyamide, of polyethylene, of polyethylene terephthalate (PET), of polyurethane or of nonwoven glass fibers.

The coating of silicone formulations on flexible supports is directed toward numerous applications. For example, when the flexible support is a textile, waterproofing properties are targeted, or when the support is a paper or a polymer of PVC or PET type, release properties are usually sought.

Release coatings are of use for many applications where it is necessary to render non-adhesive with respect to other materials a surface or a material that would normally adhere to them. For example, silicone compositions are used as release coatings for papers and can thus be combined with adhesive elements that can easily be released without losing their adhesive properties, it being possible for these elements to be pressure-sensitive adhesives for labels, decorative laminates, transfer tapes, etc. Silicone-based release coatings applied on paper, polyethylene, polypropylene, polyester and other supports of this type are also of use as release surfaces for products for food use and in particular in the industrial packaging sector.

There has consequently for a long time been a great interest in these organopolysiloxanes, comprising a (meth)acrylate function and the production thereof can be envisioned in various ways described in the prior art.

It is known that these organopolysiloxanes comprising a meth(acrylate) function are obtained industrially by reaction between an epoxy-group-functionalized organopolysiloxane and (meth)acrylic acid in the presence of a chromium-based catalyst. The (meth)acrylic acid reacts with the epoxy group to form a (meth)acrylic acid monoester comprising a hydroxyl group in the vicinal position. This reaction is for example described in the article "Makromol. Chem., RAPID COMMUN. 7, 703-707 (1986)" wherein a organopolysiloxane with chain-end epoxy functions reacts with methacrylic acid in the presence of chromium diisopropyl salicylate so as to form an α,ω-bis(methacrylate)-substituted organopolysiloxane. Patent EP 1 276 825-B1 also teaches the preparation of organopolysiloxanes comprising an acrylate function by reaction between an organopolysiloxane having epoxy functions and acrylic acid in the presence of chromium(III) acetate. These two chromium-based catalysts and chromium (III) salts in general have the drawback of being able to contain chromium(VI) which is considered to be potentially carcinogenic. It is therefore necessary to find catalysts that are just as efficient as the Cr(III) salts but do not exhibit toxicity problems. These traces of Cr(VI) can be found on all applications where organopolysiloxanes comprising an acrylate function are used. This problem is all the more critical for all applications where the release coatings are in contact with food products.

Other types of catalysts are known to catalyze this reaction between an epoxy-group-functionalized organopolysiloxane and (meth)acrylic acid. Thus, patents U.S. Pat. Nos. 4,908,274, 4,293,678, 4,558,082 and patent application EP 0 269 114 teach the use of organic catalysts such as amines (tributylamine, trimethylamine, benzyldimethylamine), tetramethylguanidine, sulfonic acid derivatives, trifluoroacetic acid or morpholine and its derivatives. For example, a cyclic diamine such as 1,4-diazabicyclo(2,2,2)octane is widely exemplified as catalyst for this reaction. However, on reading the examples, it appears that, despite very long reaction times (of about 30 hours), the reaction yields are not quantitative.

SUMMARY

In this context, one of the essential objectives of the present invention is to develop a process for producing organopolysiloxanes functionalized with (meth)acrylate groups which do not use catalysts that are toxic or capable of readily converting into a toxic product and in particular do not contain chromium-based catalysts.

Another essential objective of the present invention is to provide a process for producing organopolysiloxanes functionalized with (meth)acrylate groups with a yield and kinetics that are compatible with industrial production. Another essential objective of this invention is to provide a process for producing organopolysiloxanes functionalized with (meth)acrylate groups wherein the organopolysiloxane chain length is not modified, that is to say wherein there are no reactions producing cleavage and redistribution of siloxane bonds (shortening of chains) nor any bridging reaction (chain extension), for example by side reaction between an epoxide and the hydroxyl function of the hydroxyacrylate or by polymerization of the epoxides.

Another objective of this invention is to provide a process for producing a silicone coating on a substrate. It is desired to obtain coated substrates which do not exhibit any toxicity problems.

All these objectives, among others, are achieved by means of the present invention which relates to a process for producing an organopolysiloxane A comprising at least one (meth)acrylate group, said process comprising the following steps:
 a) the following are reacted at a temperature of between 50 and 140° C., preferably between 70 and 130° C.:

at least one organopolysiloxane B comprising at least one epoxy group,
with acrylic acid or methacrylic acid or a mixture of the two,
in the presence of a catalyst C which is a complex of iron in the oxidation state (III), of formula (1) below:

$$[Fe(L^1)_3] \quad (1)$$

in which the symbols $L^1$, which may be identical or different, represent a ligand chosen from the group made up of: a β-dicarbonylato anion or the enolate anion of a β-dicarbonyl compound, a carbon/late anion and an alkoxide anion, and
of at least one solvent, and
b) the product obtained, which is said organopolysiloxane A or a mixture containing predominantly said organopolysiloxane A is isolated.

DETAILED DESCRIPTION OF A PREFERRED EMBODIMENT

The term "mixture containing predominantly said organopolysiloxane A" is intended to mean a mixture comprising at least 85% by weight of organopolysiloxane A, preferably at least 90% by weight of organopolysiloxane A and even more preferentially at least 95% by weight of organopolysiloxane A.

The process for producing an organopolysiloxane A comprising at least one (meth)acrylate group according to the invention has the advantage of not modifying the chain length of the starting organopolysiloxane B while at the same time having a yield and kinetics that are compatible with industrial production. Furthermore, this process has the advantage of not using catalysts that are toxic or capable of converting into a toxic product, and in particular this process does not use chromium-based catalysts.

Those skilled in the art will be able to adjust the reaction time of step a) of the process according to the invention according to the temperature and the concentration of catalyst C used in order to obtain the desired degree of conversion. According to one preferential embodiment of the invention, the duration of step a) is between one and ten hours when the temperature of step a) is between 70 and 130° C.

The organopolysiloxane A obtained by means of the process of the invention comprises siloxyl units (I.2), (I.3), and optionally (I.1) having the formulae below:

  (I.1)

  (I.2)

  (I.3)

in which:
a=1 or 2, b=0, 1 or 2 and a+b=1, 2 or 3,
c=1, 2 or 3,
d=1 or 2, e=0, 1 or 2 and d+e=1, 2 or 3,
the symbols Y, which may be identical or different, represent a hydrocarbon-based group comprising an epoxy group and optionally also comprising one or more heteroatoms such as an oxygen atom, said hydrocarbon-based group Y preferably having from 2 to 20 carbon atoms inclusive, and even more preferentially Y is chosen from the group made up of an alkyl glycidyl ether, a linear, branched or cyclic epoxy alkyl, a linear, branched or cyclic epoxy alkenyl and a carboxylic acid glycidyl ester;
the symbols $Z^1$ and $Z^2$, which may be identical or different, represent a monovalent hydrocarbon-based group having from 1 to 30 carbon atoms and preferably chosen from the group made up of alkyl groups having from 1 to 8 carbon atoms and aryl groups having from 6 to 12 carbon atoms, and even more preferentially chosen from the group made up of a methyl, ethyl, propyl, 3,3,3-trifluoropropyl, xylyl, tolyl and phenyl group,
the symbols V, which may be identical or different, represent a hydrocarbon-based group comprising a (meth)acrylate group, said hydrocarbon-based group V preferably having from 5 to 23 carbon atoms inclusive, and,
said organopolysiloxane A comprises, per molecule, at least two silicon atoms and at least one siloxyl unit (I.3).

The organopolysiloxane B comprises siloxyl units (I.4) and (I.5) having the formulae below:

 and  (I.4)

  (I.5)

in which:
a=1 or 2, b=0, 1 or 2 and a+b=1, 2 or 3,
c=1, 2 or 3,
the symbols Y, which may be identical or different, represent a hydrocarbon-based group comprising an epoxy group and optionally also comprising one or more heteroatoms such as an oxygen atom, said hydrocarbon-based group Y preferably having from 2 to 20 carbon atoms inclusive, and even more preferentially Y is chosen from the group made up of an alkyl glycidyl ether, a linear, branched or cyclic epoxy alkyl, a linear, branched or cyclic epoxy alkenyl and a carboxylic acid glycidyl ester;
the symbols $Z^1$ and $Z^2$, which may be identical or different, represent a monovalent hydrocarbon-based group having from 1 to 30 carbon atoms and preferably chosen from the group made up of alkyl groups having from 1 to 8 carbon atoms and aryl groups having from 6 to 12 carbon atoms, and even more preferentially chosen from the group made up of a methyl, ethyl, propyl, 3,3,3-trifluoropropyl, xylyl, tolyl and phenyl group, and
said organopolysiloxane B comprises, per molecule, at least two silicon atoms and at least one siloxyl unit (I.4).

Preferably, for the siloxyl unit (I.4), the symbol Y is chosen from the group made up of the hydrocarbon-based groups (R-1) to (R-6) having the formulae below:

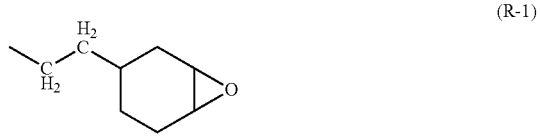  (R-1)

-continued

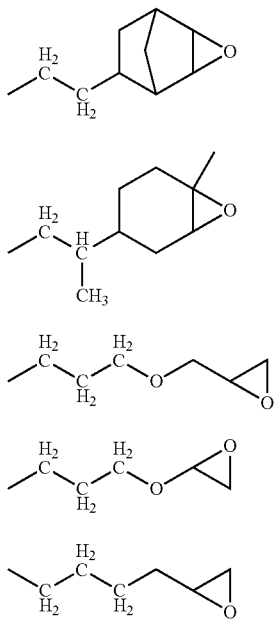

(R-2)

(R-3)

(R-4)

(R-5)

(R-6)

According to one particularly preferred embodiment, in the siloxyl unit (I.4), the symbol Y is the hydrocarbon-based group (R-4) having the formula below:

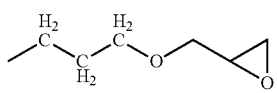

(R-4)

These organopolysiloxanes B can have a linear, branched or cyclic structure and their degree of polymerization is between 2 and 5000, preferably between 2 and 1000 and even more preferentially between 2 and 500.

Preferably, the organopolysiloxane B has a linear structure and comprises siloxyl units (I.4) and (I.5) having the formulae below:

$$Y_a Z^1_b SiO_{\frac{4-(a+b)}{2}}$$ (I.4)

$$Z^2_c SiO_{\frac{4-c}{2}}$$ (I.5)

in which:
  a=1 or 2, b=0, 1 or 2 and a+b=2 or 3,
  c=2 or 3,
  the symbols Y, which may be identical or different, represent a hydrocarbon-based group comprising an epoxy group and optionally also comprising one or more heteroatoms such as an oxygen atom, said hydrocarbon-based group Y preferably having from 2 to 20 carbon atoms inclusive, and even more preferentially Y is chosen from the group made up of an alkyl glycidyl ether, a linear, branched or cyclic epoxy alkyl, a linear, branched or cyclic epoxy alkenyl and a carboxylic acid glycidyl ester;
  the symbols $Z^1$ and $Z^2$, which may be identical or different, represent a monovalent hydrocarbon-based group having from 1 to 30 carbon atoms and preferably chosen from the group made up of alkyl groups having from 1 to 8 carbon atoms and aryl groups having from 6 to 12 carbon atoms, and even more preferentially chosen from the group made up of a methyl, ethyl, propyl, 3,3,3-trifluoropropyl, xylyl, tolyl and phenyl group, and
  said organopolysiloxane B comprising, per molecule, at least two silicon atoms and at least one siloxyl unit (I.4).

When it is a linear polymer, the organopolysiloxane B essentially consists of siloxyl units "D" chosen from the group made up of the siloxyl units $Y_2SiO_{2/2}$, $YZ^1SiO_{2/2}$ and $Z^2_2SiO_{2/2}$, and of siloxyl units "M" chosen from the group made up of the siloxyl units $Y_3SiO_{1/2}$, $YZ^1_2SiO_{1/2}$, $Y_2Z^1SiO_{1/2}$ and $Z^2_3SiO_{1/2}$. The symbols Y, $Z^1$ and $Z^2$ are as described above.

According to one preferred embodiment of the invention, the organopolysiloxane B essentially consists of siloxyl units "D" chosen from the group made up of the siloxyl units $YZ^1SiO_{2/2}$ and $Z^2_2SiO_{2/2}$, and of siloxyl units "M" chosen from the group made up of the siloxyl units $YZ^1_2SiO_{1/2}$ and $Z^2_3SiO_{1/2}$. The symbols Y, $Z^1$ and $Z^2$ are as described above.

The organopolysiloxane B has a dynamic viscosity measured at 25° C. with a controlled-stress rheometer of Brookfield type of between 1 and 100 000 mPa·s, preferably between 10 and 50 000 mPa·s and even more preferentially between 10 and 10 000 mPa·s.

According to one preferential embodiment of the invention, the organopolysiloxane B contains, per molecule, from 1 to 100 siloxyl units (I.4) bearing at least one hydrocarbon-based group comprising an epoxy group. According to a more preferential embodiment, the organopolysiloxane B contains, per molecule, from 2 to 50 siloxyl units (I.4).

According to another embodiment, the organopolysiloxane B contains from 1% to 60% by weight of hydrocarbon-based groups Y comprising an epoxy group, preferably from 1% to 30% by weight and even more preferentially from 1% to 15% by weight.

According to one preferential embodiment of the process according to the invention, the organopolysiloxane B is chosen from the compounds of formulae (B-1) to (B-4) below:

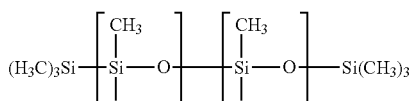

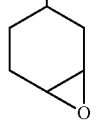

(B-1) in which R is an alkyl group comprising from 2 to 5 carbon atoms, a is between 2 and 50 and b is between 20 and 400.

(B-2) in which n is between 0 and 250.

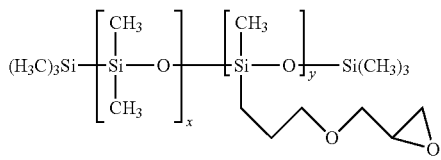

(B-3) in which x is between 10 and 300 and y is between 2 and 30.

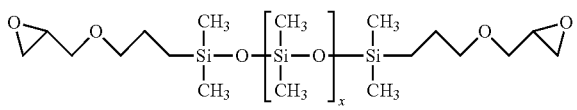

(B-4) in which x is between 0 and 250.

According to the applications envisioned for the organopolysiloxane A, a total or partial degree of conversion of the epoxy functions of the organopolysiloxane B can be sought. It is thus possible to obtain an organopolysiloxane A comprising epoxy functions and (meth)acrylate functions which can be used for example as an adhesion modulator or as an adhesion promoter, or an organopolysiloxane A comprising only or essentially (meth)acrylate functions, used for example as an essential constituent of the radical-crosslinkable silicone compositions for producing an elastomer. The molar ratio R between the (meth)acrylic acid and the epoxy functions of the organopolysiloxane B used in the process will be adjusted accordingly.

According to one embodiment of the invention, this ratio R is between 0.1 and 10, preferably between 0.5 and 5 and even more preferentially between 0.5 and 2.

The catalyst C is a complex of iron in the oxidation state (III), of formula (1) below:

$$[Fe(L^1)_3] \qquad (1)$$

in which the symbols $L^1$, which may be identical or different, represent a ligand chosen from the group made up of: a β-dicarbonylato anion or the enolate anion of a β-dicarbonyl compound, a carboxylate anion and an alkoxide anion.

Preferably, the β-dicarbonylato anion or the enolate anion of a β-dicarbonyl compound is an anion derived from a compound of formula (2):

$$R^1COCHR^2COR^3 \qquad (2)$$

in which:
$R^1$ and $R^3$, which may be identical or different, represent a linear, cyclic or branched $C_1$-$C_{30}$ hydrocarbon-based radical, an aryl containing between 6 and 12 carbon atoms, or a radical —$OR^4$ with $R^4$ representing a linear, cyclic or branched $C_1$-$C_{30}$ hydrocarbon-based radical,
$R^2$ is a hydrogen atom or a hydrocarbon-based radical, preferably alkyl radical, comprising from 1 to 4 carbon atoms; with
$R^1$ and $R^2$ possibly being linked so as to form a $C_5$-$C_6$ ring, and
$R^2$ and $R^4$ possibly being linked so as to form a $C_5$-$C_6$ ring.

Advantageously, the β-dicarbonylato anion or the enolate anion of a β-dicarbonyl compound is an anion derived from a β-diketone chosen from the group made up of: 2,4-pentanedione (acac); 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-heptanedione; 2,6-dimethyl-3,5-heptanedione; 2-acetylcyclohexanone (Cy-acac); 2,2,6,6-tetramethyl-3,5-heptanedione (TMHD); 1,1,1,5,5,5-hexafluoro-2,4-pentanedione (F-acac); benzoylacetone; dibenzoylmethane; 3-methyl-2,4-pentanedione; 3-acetylpentan-2-one; 3-acetyl-2-hexanone; 3-acetyl-2-heptanone; 3-acetyl-5-methyl-2-hexanone; stearoyl-benzoylmethane; octanoylbenzoylmethane; 4-t-butyl-4'-methoxydibenzoylmethane; 4,4'-dimethoxydibenzoylmethane and 4,4'-di-tert-butyl-dibenzoylmethane.

According to another preferred embodiment of the invention, the β-dicarbonylato anion or the enolate anion of a β-dicarbonyl compound is a β-ketoesterato anion chosen from the group made up of the anions derived from the following compounds: methyl, ethyl, n-propyl, isopropyl, n-butyl, sec-butyl, isobutyl, tert-butyl, isopentyl, n-hexyl, n-octyl, methyl-1-heptyl, n-nonyl, n-decyl and n-dodecyl esters of acetylacetic acid or those described in patent application FR-A-1435882.

According to one preferential embodiment of the process of the invention, the catalyst C is a complex of iron in the oxidation state (III), of formula (1) below:

$$[Fe(L^1)_3] \qquad (1)$$

in which the symbols $L^1$, which may be identical or different, represent a ligand chosen from the group made up of a carboxylate anion and an alkoxide anion and even more preferentially the catalyst C is an iron(III) carboxylate or an iron(III) alkoxide.

According to one embodiment of the invention, the catalyst C is an iron(III) carboxylate of formula (1) in which the symbols $L^1$ are ligands, which may be identical or different, chosen from the group of carboxylate anions, having from 1 to 40 carbon atoms.

The carboxylate ligands $L^1$ that are of use according to the invention are for example:
the anions derived from aliphatic carboxylic acids such as the anions: methanoate or formate [H—COO]$^-$, ethanoate or acetate [$CH_3$—COO]$^-$, propanoate or propionate [$CH_3CH_2$—COO]$^-$, butanoate or butyrate [$CH_3$—$(CH_2)_2$—COO]$^-$, pentanoate or valerate [$CH_3$—$(CH_2)_3$—COO]$^-$, hexanoate or caproate [$CH_3$—$(CH_2)_4$—COO]$^-$, heptanoate [$CH_3$—$(CH_2)_5$—COO]$^-$, octanoate [$CH_3$—$(CH_2)_6$—COO]$^-$, 2-ethyl hexanoate [$CH_3$—$(CH_2)_4$—$CH(C_2H_5)$—COO]$^-$, nonanoate [$CH_3$—$(CH_2)_7$—COO]$^-$, decanoate [$CH_3$—$(CH_2)_8$—COO]$^-$, undecanoate [$CH_3$—$(CH_2)_9$—COO]$^-$, dodecanoate or laurate [$CH_3$—$(CH_2)_{10}$—COO]$^-$, tridecanoate [$CH_3$—$(CH_2)_{11}$—COO]$^-$, tetradecanoate or myristate [$CH_3$—$(CH_2)_{12}$—COO]$^-$, pentadecanoate [$CH_3$—$(CH_2)_{13}$—COO]$^-$, hexadecanoate or palmitate [$CH_3$—$(CH_2)_{14}$—COO]$^-$, heptadecanoate [$CH_3$—$(CH_2)_{15}$—COO]$^-$, octadecanoate or stearate [$CH_3$—$(CH_2)_{16}$—COO]$^-$, nonadecanoate [$CH_3$—$(CH_2)_{17}$—COO]$^-$, eicosanoate [$CH_3$—$(CH_2)_{18}$—COO]$^-$, heneicosanoate [$CH_3$—$(CH_2)_{19}$—COO]$^-$, docosanoate or behenate [$CH_3$—$(CH_2)_{20}$—COO]$^-$, tricosanoate [$CH_3$—$(CH_2)_{21}$—COO]$^-$, tetracosanoate or lignocerate [$CH_3$—$(CH_2)_{22}$—COO]$^-$, pentacosanoate [$CH_3$—$(CH_2)_{23}$—COO]$^-$, hexacosanoate [$CH_3$—$(CH_2)_{24}$—COO]$^-$, heptacosanoate acid [$CH_3$—$(CH_2)_{25}$—COO]$^-$, octacosanoate [$CH_3$—$(CH_2)_{26}$—COO]$^-$, nonacosanoate [$CH_3$—$(CH_2)_{27}$—COO]$^-$, triacontanoate [$CH_3$—$(CH_2)_{28}$—COO]$^-$, hentriacontanoate [CH₃—(CH₂)₂₉—COO]⁻, dotriacontanoate [CH₃—(CH₂)₃₀—COO]⁻, palmitoleate [CH₃—(CH₂)₅—CH=CH—(CH₂)₇—COO]⁻, oleate [CH₃(CH₂)₇CH=CH(CH₂)₇COO]⁻, linoleate [CH₃—(CH₂)₄—(CH=CHCH₂)₂—(CH₂)₆—COO]⁻, linolenate [CH₃—CH₂—(CH=CHCH₂)₃—(CH₂)₆—COO]⁻, arachidonate [CH₃—(CH₂)₄—(CH=CHCH₂)₄—(CH₂)₂—COO]⁻, the anions derived from substituted aliphatic carboxylic acids such as, for example, neopentanoate or pivalate [(CH₃)₃C—COO]⁻, neononanoate [(CH₃)₃C—(CH₂)₄—COO]⁻, or else the following $C_{10}$ structural isomers, taken alone or as a mixture (neodecanoate): 7,7-dimethyl octanoate [(CH₃)₃C—(CH₂)₅—COO]⁻, 2,2-dimethyl octanoate [CH₃—(CH₂)₅—C(CH₃)₂—COO]⁻, 2,2,3,5-tetramethyl hexanoate [(CH₃)₂CH—CH₂—CH(CH₃)—C(CH₃)₂—COO]⁻, 2,5-dimethyl-2-ethyl hexanoate [(CH₃)₂CH—(CH₂)₂—C(CH₃)(C₂H₅)—COO]⁻, 2,2-diethyl hexanoate [CH₃—(CH₂)₃—C(C₂H₅)₂—COO]⁻, 2,4-dimethyl-2-isopropyl pentanoate [(CH₃)₂CH—CH₂—C(CH₃)(i-propyl)-COO]⁻, the corresponding carbon/late anions of Versatic™ acid 10 (sold by the company Momentive) of empirical formula [C₁₀H₁₉O₂]⁻ and of linear formula [(R₁)(R₂)C(CH₃)—COO]⁻ with the symbols $R_1$ and $R_2$ being alkyls, the anions derived from aromatic carboxylic acids, such as the anions of benzoate, phenyl acetate, phenyl propionate or phenyl butyrate type, the anions derived from carboxylic acids comprising an unsaturation, such as the acrylate anion or the methacrylate anion, and the naphthenate anions.

$C_{10}$ to $C_{20}$ naphthenate anions are the corresponding anions of naphthenic acids. Naphthenic acids are by-products of the extraction of bitumen oil sands and are found mainly in oil sand residues. Commercial mixtures of naphthenic acids are used as solvents, detergents and rubber recovering agents. They may be mixtures of monocyclic and/or bicyclic carboxylic acids.

According to one embodiment of the process, it is preferable for the ligands not to have too high a molecular weight. Consequently, according to one preferential mode, the carboxylate ligands have from 1 to 20 carbon atoms, and even more preferentially from 1 to 12 carbon atoms.

According to one particularly advantageous embodiment, the catalyst C is a carboxylate of iron in the oxidation state (III) chosen from the group made up of iron acrylate, iron methacrylate, iron pentanoate, iron stearate, iron neononanoate, iron neodecanoate, iron naphthenate and iron benzoate and mixtures thereof. More preferentially, the catalyst C is a carboxylate of iron in the oxidation state (III) chosen from the group made up of iron acrylate, iron methacrylate, iron neodecanoate, iron naphthenate and mixtures thereof.

It is important to note that the iron(III) carboxylate can be generated in situ, for example from an iron(II) carboxylate which, in the reaction medium comprising (meth)acrylic acid, will be converted into iron(III) carboxylate.

According to another embodiment, the catalyst C is an iron alkoxide corresponding to formula (3) below:

$$Fe(OC_nH_{(2n+1)})_3 \qquad (3)$$

in which n is between 1 and 6 and preferably n is between 2 and 5.

Preferably, the alkoxides of iron in the oxidation state (III) are chosen from the group made up of iron ethoxide, iron isopropylate and iron butylate.

According to one embodiment, the concentration of catalyst C expressed as mole % relative to the epoxy functions of the organopolysiloxane B, is between 0.5% and 10%, preferably between 1% and 5% and even more preferentially between 1% and 3%.

According to one preferred embodiment of the invention, the solvent is a solvent S1 chosen from protic polar solvents, preferably from primary alcohols comprising from 2 to 6 carbon atoms and more preferentially from the group made up of ethanol, isopropanol, butanol and mixtures thereof.

According to one preferred embodiment of the process according to the invention, step a) is carried out in the presence of a solvent S1 as described above and of a solvent S2 which is chosen from the group made up of methyl isobutyl ketone, methyl ethyl ketone, toluene, xylene, chlorobenzene and mixtures thereof.

The total content of solvent used in step a) of the process as described above is between 5% and 50% by weight, preferably between 5% and 40% by weight and even more preferentially between 10% and 30% by weight, relative to the total weight of the composition used in said step a) of the process.

Without wanting to be bound by any theory, the solvent S1 makes it possible to dissolve the catalyst C which is predominantly in solid form, and the solvent S2 improves the homogenization and the mixing of the catalyst C dissolved in the solvent S1 with the organopolysiloxane B.

According to one embodiment of the invention, in step b), the product is isolated by devolatilization. For this, the reaction medium resulting from step a) is heated at a temperature of between 80 and 130° C. under reduced pressure. This devolatilization step makes it possible to evaporate off the solvent(s) and the excess (meth)acrylic acid.

According to another embodiment, a filtration step can also be carried out before or after the devolatilization. Preferably, if a filtration step is added to the process according to the invention, it is carried out after the devolatilization.

According to one preferred embodiment of the process according to the invention, during step a), a (meth)acrylic acid polymerization inhibitor can also be added. (Meth)acrylic acid polymerization inhibitors are widely known and, by way of example, mention may be made of alkylphenols such as methoxyphenol and hydroquinone or alkyldiphenylamines, for instance phenothiazine.

According to another embodiment, the invention relates to a process for producing an organopolysiloxane A comprising at least one (meth)acrylate group, said process comprising the following steps:

a) the following are reacted at a temperature of between 50 and 140° C., preferably between 70 and 130° C.:
at least one organopolysiloxane B comprising at least one epoxy group,
with acrylic acid or methacrylic acid or a mixture of the two,
in the presence of a catalyst C which is a complex of iron in the oxidation state (III), of formula (1) below:

$$[Fe(L_1)_3] \qquad (1)$$

in which the symbols $L_1$, which may be identical or different, represent a ligand chosen from the group made up of: a β-dicarbonylato anion or the enolate anion of a β-dicarbonyl compound, a carboxylate anion and an alkoxide anion,
of at least one solvent, and
of at least one polymerization inhibitor and
b) the product obtained, which is said organopolysiloxane A or a mixture containing predominantly said organopolysiloxane A, is isolated.

During the implementation of the process, it is possible but not necessary to carry out steps a) and b) under an inert atmosphere. According to one preferred embodiment, when a phenolic compound is used as (meth)acrylic acid inhibitor, steps a) and b) of the process will be carried out under air and even more preferentially under flushing with dry air.

Another subject of the invention relates to a composition X which is a precursor of said organopolysiloxane A obtained by means of the process as described above and stable with respect to storage at a temperature of 20° C., comprising:
at least one organopolysiloxane B comprising at least one epoxy function,
acrylic acid or methacrylic acid or a mixture of the two,
a catalyst C which is a complex of iron in the oxidation state (III), of formula (1) below:

$$[Fe(L^1)_3] \quad (1)$$

in which the symbols $L^1$, which may be identical or different, represent a ligand chosen from the group made up of: a β-dicarbonylato anion or the enolate anion of a β-dicarbonyl compound, a carboxylate anion and an alkoxide anion, and
at least one solvent.

The organopolysiloxane B and the catalyst C are as defined above.

The composition X comprises at least one solvent which can be a solvent $S_1$ and/or a solvent $S_2$ as defined above.

The composition X can also comprise a polymerization inhibitor as described above.

According to another embodiment, the composition X consists of:
at least one organopolysiloxane B comprising at least one epoxy function,
acrylic acid or methacrylic acid or a mixture of the two,
a catalyst C which is a complex of iron in the oxidation state (III), of formula (1) below:

$$[Fe(L^1)_3] \quad (1)$$

in which the symbols $L^1$, which may be identical or different, represent a ligand chosen from the group made up of: a β-dicarbonylato anion or the enolate anion of a β-dicarbonyl compound, a carboxylate anion and an alkoxide anion,
at least one solvent $S_1$ and/or one solvent $S_2$, and
optionally a polymerization inhibitor.

The organopolysiloxane B, the catalyst C and the solvents $S_1$ and $S_2$ are as defined above.

According to another embodiment, the composition X consists of:
at least one organopolysiloxane B comprising at least one epoxy function,
acrylic acid or methacrylic acid or a mixture of the two,
a catalyst C which is a complex of iron in the oxidation state (III), of formula (1) below:

$$[Fe(L^1)_3] \quad (1)$$

in which the symbols $L^1$, which may be identical or different, represent a ligand chosen from the group made up of: a β-dicarbonylato anion or the enolate anion of a β-dicarbonyl compound, a carboxylate anion and an alkoxide anion,
at least one solvent $S_1$ and/or one solvent $S_2$, and
at least one polymerization inhibitor.

The organopolysiloxane B, the catalyst C and the solvents $S_1$ and $S_2$ are as defined above.

According to one embodiment of the invention, in the composition X, the molar ratio R between the (meth)acrylic acid and the epoxy functions of the organopolysiloxane B is between 0.1 and 10, preferably between 0.5 and 5 and even more preferentially between 0.5 and 2.

A final subject of the invention relates to a process for producing a coating on a substrate, comprising the following steps:
a) an organopolysiloxane A is prepared according to the process as described above,
b) a radical-crosslinkable silicone composition W is prepared by adding, to the organopolysiloxane A:
  i. a photoinitiator, and
  ii. optionally one or more additives,
c) said composition W is applied on a substrate, and
d) said composition W is crosslinked by exposure to radiation.

According to one preferred embodiment of the invention, in step d), the radiation is ultraviolet light with a wavelength of less than 400 nanometers.

The irradiation time may be short and it is generally less than 1 second and is about a few hundredths of a second for small coating thicknesses. The crosslinking obtained is excellent even in the absence of any heating.

According to another embodiment, the crosslinking step d) is carried out at a temperature of between 40 and 100° C.

Of course, the curing time can be adjusted, in particular through the number of UV lamps used, through the UV-exposure time and through the distance between the composition and the UV lamp.

The amount of composition W deposited on the substrate is variable and usually extends between 0.1 and 5 g/m² of surface treated. This amount depends on the nature of the support and on the desired release properties. It is usually between 0.5 and 1.5 g/m².

This process is particularly suitable for producing a silicone release coating on a substrate which is a flexible support made of textile, of paper, of polyvinyl chloride, of polyester, of polypropylene, of polyamide, of polyethylene, of polyethylene terephthalate, of polyurethane or of nonwoven glass fibers.

These coatings are particularly suitable for use thereof in the release field.

For polymerizing organopolysiloxanes functionalized with (meth)acrylate groups, those skilled in the art will be able to choose a suitable radical photoinitiator which absorbs light radiation with a wavelength of less than 400 nm. As examples of radical photoinitiators, mention may be made of: α-hydroxy ketones, benzoin ethers and aromatic α-amino ketones. By way of examples of radical photoinitiator, mention will in particular be made of the following products: isopropylthioxanthone; benzophenone; camphorquinone; 9-xanthenone; anthraquinone; 1,4-dihydroxyanthraquinone; 2-methylanthraquinone; 2,2'-bis(3-hydroxy-1,4-naphthaquinone); 2,6-dihydroxy-anthraquinone; 1-hydroxycyclohexyl phenyl ketone; 1,5-dihydroxyanthraquinone; 1,3-diphenyl-1,3-propanedione; 5,7-dihydroxyflavone; dibenzoyl peroxide; 2-benzoylbenzoic acid; 2-hydroxy-2-methylpropiophenone; 2-phenylacetophenone; 2,4,6-trimethylbenzoyldiphenylphosphine oxide; anthrone; bis (2,6-dimethylbenzoyl)-2,4,4-trimethylpentylphosphine oxide; 4,4'-dimethoxybenzoin; phenanthrenequinone; 2-ethylanthraquinone; 2-methylanthraquinone; 1,8-dihydroxyanthraquinone; dibenzoyl peroxide; 2,2-dimethoxy-2-phenylacetophenone; benzoin; 2-hydroxy-2-methylpropiophenone; benzaldehyde; 4-(2-hydroxyethoxy) phenyl-(2-hydroxy-2-methylpropyl) ketone; benzoylacetone; ethyl (2,4,6-trimethylbenzoyl)phenylphosphinate, and mixtures thereof.

By way of examples of commercial products of radical photoinitiators, mention is made of the products sold by the company Ciba-Geigy: Irgacure® 369, Irgacure® 651, Irgacure® 907, Darocure® 1173, etc.

The amount of photoinitiator in the composition W is generally between 0.001 and 5 parts by weight, usually between 0.005 and 3 parts by weight, per 100 parts by weight of the composition W.

As additive, it is possible to include at least one additive for regulating the force of detachment of a silicone/adhesive interface in the composition, which is chosen from:
(i) (meth)acrylate organic derivatives, and
(ii) silicones comprising (meth)acrylate function(s).

Suitable in particular as (meth)acrylate organic derivatives are the compounds: epoxidized (meth)acrylates, (meth)acryloglyceropolyesters, (meth)acrylourethanes, (meth)acrylopolyethers, (meth)acrylopolyesters and (meth)acryloacrylics. More particularly preferred are trimethylolpropane triacrylate, tripropylene glycol diacrylate and pentaerythritol tetraacrylate.

According to one preferred variant of the invention, the additive used is a silicone comprising (meth)acrylate function(s). By way of representation of (meth)acrylate functions borne by the silicone and most particularly suitable for the invention, mention may more particularly be made of acrylate, methacrylate, (meth)acrylate ether and (meth)acrylate ester derivatives bonded to the polysiloxane chain by an Si—C bond. Such acrylate derivatives are in particular described in patents EP 281 718, FR 2 632 960 and EP 940 458.

Other additives, such as thiols or aromatic amines, can be added in order to accelerate the crosslinking of the composition W.

The present invention is illustrated hereinafter by non-limiting examples.

EXAMPLES

1 Screening of the Catalysts with Model Mixtures

In order to compare the efficiency of the various species as catalysts for reaction between the epoxy functions grafted on to an organopolysiloxane and the (meth)acrylic acid, a model mixture was used in order to be able to simultaneously evaluate:
the degree of conversion of the epoxy functions,
the yield of hydroxyacrylate which is the desired product ($\alpha$ and $\beta$ isomers) and of various by-products,
the siloxane bond cleavage (chain shortening) reactions, and
the bridging (chain extension) reactions by reaction between an epoxy function and an alcohol function of the hydroxyacrylate or by polymerization of the epoxies.

Various families of compounds were evaluated as catalysts for this reaction.

Firstly, organic catalysts such as:
triethylamine or Et$_3$N,
N-methylmorpholine or 4-methylmorpholine,
tetramethylguanidine or TMG,
triphenylphosphine or PPh$_3$,
tetrabutylammonium chloride or Bu$_4$NCl,
1-ethylimidazole, and
1-butyl-3-methylimidazolium bromide or BMIBr.

Secondly, various metal salts such as:
lithium hydroxide or LiOH,
potassium hydroxide or KOH,
magnesium acrylate or Mg(acrylate)$_2$,
cerium acetate or Ce(OAc)$_3$,
butyl titanate Ti(OnBu)$_4$,
zinc acrylate or Zn(acrylate)$_2$, and
aluminum acrylate or Al(acrylate)$_3$.

In addition, in particular iron compounds:
iron(III) acetylacetonate or Fe(acac)$_3$,
Fe(octanoate)$_{2.4}$(R$_{50}$)$_{0.6}$ or Fe(oct)$_{2.4}$(R$_{50}$)$_{0.6}$ with R$_{50}$ being the benzoylstearoylmethane anion,
iron(III) acrylate or Fe(acrylate)$_3$,
iron(III) ethoxide or Fe(OCH$_2$CH$_3$)$_3$,
iron(III) trifluoromethanesulfonate or Fe(OTf)$_3$,
iron(III) pentanoate or iron(III) valerate or Fe(valerate)$_3$,
iron(III) 2-ethylhexanoate or Fe(2-EH)$_3$,
iron(III) stearate or iron(III) octodecanoate or Fe(stearate)$_3$,
iron(III) benzoate or Fe(benzoate)$_3$,
iron(III) neopentanoate or iron(III) pivalate or Fe(pivalate)$_3$,
iron(III) neononanoate or Fe(neononanoate)$_3$,
iron(III) neodecanoate or Fe(ND)$_3$,
iron(III) naphthenate or Fe(naphthenate)$_3$,
iron(III) oxide or Fe$_2$O$_3$,
anhydrous iron(III) chloride or iron(III) chloride hydrate, or anhydrous FeCl$_3$ or FeCl$_3$ hydrate,
iron(III) hydroxide or Fe(OH)$_3$,
powdered iron in the oxidation state zero or Fe°, and
chromium acetate Cr(OAc)$_3$ as comparative.

If an organopolysiloxane comprising epoxy groups is used directly as reagent, it is very difficult to obtain the yields since the analysis of the reaction medium is very complex. Hence, a model mixture is used for the catalyst screening tests, the procedure of which is the following.

The following are introduced into a laboratory reaction vessel:
2.3 grams of butyl glycidyl ether (BGE) at 95% purity, that is to say 16.1 mmol,
7.5 grams of octamethyltrisiloxane,
2.2 grams of acrylic acid at 99% purity, that is to say 31.6 mmol,
10 mg of 4-methoxyphenol, and
the corresponding amount of catalyst (see table 1).

The reaction medium is kept stirring and at the desired temperature and is flushed with a stream of dry air. Samples of the reaction medium are taken and assayed by gas chromatography in order to evaluate the degree of conversion of the butyl glycidyl ether, the yield of "hydroxyacrylate" ($\alpha$ and $\beta$ isomers) which is the desired product, the yield of "diester-ol" which is a by-product obtained by the addition of diacrylic acid, a by-product of acrylic acid, and/or of the Michael adduct of acrylic acid on the hydroxyacrylate and the degradation of the silicone oil (by chain extension or bridging).

The results are presented in table 1. The amount of catalyst is expressed in mole % relative to the butyl glycidyl ether (BGE). The degrees of conversion and yields (Yld) are indicated as mole % relative to the BGE. The silicone oil degradation is monitored by the degree of conversion (DC) of the oil, expressed as mole %.

TABLE 1

| Catalyst | Mole % | T (° C.) | Reaction time (h) | Degree of conversion BGE (%) | Yld α and β hydroxy acrylate (%) | Yld diester-ol (%) | Silicone degradation DC (%) |
|---|---|---|---|---|---|---|---|
| Cr(OAc)$_3$ | 3 | 80 | 8 | 99.2 | 94 | 4 | NO |
| Et$_3$N | 10 | 80 | 8 | 80 | 70 | | YES (9%) |
| N-Methylmorpholine | 2 | 80 | 8 | 54 | 48 | 3.4 | YES (2%) |
| TMG | 2 | 80 | 8 | 61 | 53 | 3.9 | YES (4%) |
| PPh$_3$ | 5 | 80 | 8 | 95 | 81 | 9 | YES (9%) |
| Bu$_4$NCl | 2 | 80 | 8 | 64 | 52 | 4.2 | YES (5%) |
| 1-Ethylimidazole | 2 | 80 | 8 | 62 | 56 | 4.3 | YES (4%) |
| BMIBr | 2 | 80 | 8 | 65 | 57 | 4.4 | YES (4%) |
| LiOH | 20 | 80 | 8 | 75 | 70 | 4.7 | YES (1%) |
| KOH | 5 | 80 | 8 | 56 | 49 | 3.5 | YES (2%) |
| Mg(acrylate)$_2$ | 5 | 80 | 8 | 59 | 53 | 4 | NO |
| Mg(acrylate)$_2$ | 5 | 110 | 8 | 88 | 76 | 8 | YES (1%) |
| Ce(OAc)$_3$ | 5 | 80 | 8 | 47 | 44 | 3 | NO |
| Ti(OnBu)$_4$ | 3 | 80 | 5 | 98 | 86 | 5 | YES (0.3%) |
| Zn(acrylate)$_2$ | 5 | 80 | 8 | 7 | 7 | 0.6 | NO |
| Al(acrylate)$_3$ | 3 | 80 | 8 | 8 | 6 | 0.5 | YES (1%) |
| Fe(acac)$_3$ | 10 | 80 | 8 | 62 | 58 | 3.6 | NO |
| Fe(oct)$_{2.4}$(R$_{50}$)$_{0.6}$ | 1 | 80 | 8 | 15 | 12 | 0.3 | NO |
| Fe(acrylate)$_3$ | 10 | 80 | 8 | 68.5 | 60.5 | 4.8 | NO |
| Fe(acrylate)$_3$ | 5 | 110 | 8 | 90 | 80 | 6.2 | NO |
| Fe(OTf)$_3$ | 1 | 80 | 5 | 94* | 22 | 6 | — |

*Significant degradation of the BGE;
— not measured

Strong bases, whether they are nitrogenous organic bases, bases in the Lewis sense or alkali metal hydroxides, have the drawback of degrading silicone oils via siloxane-chain cleavage reactions, which is totally unacceptable for our application.

The metal salts do not systematically have this drawback. Some catalysts result in low degrees of degradation of silicone, such as magnesium acrylate or aluminum acrylate and also butyl titanate.

Iron(III) acrylate exhibits good activity and selectivity for this reaction despite a low solubility in the medium, hence the need to use high concentrations of catalyst. Iron(III) trifluoromethanesulfonate or Fe(OTf)$_3$ strongly degrades the butyl glycidyl ether, resulting in a very low yield of desired product. Iron acetylacetonate also exhibits good activity and selectivity in terms of desired product. The Fe(oct)$_{2.4}$(R$_{50}$)$_{0.6}$ complex, despite its low concentration in the reaction medium, makes it possible to obtain good selectivity.

Further tests were carried out according to the same procedure as the previous ones, by adding to the reaction medium a mixture of solvents composed of 2.5 g of methyl isobutyl ketone (MIBK) and 3 g of n-butanol. A new by-product is quantified, "butoxy-ol", which is the product of reaction between the n-butanol solvent and the butyl glycidyl ether. The results are presented in table 2 below. The amount of catalyst is expressed as mole % relative to the butyl glycidyl ether (BGE). The degrees of conversion and yields (Yld) are indicated as mole % relative to the BGE. All the tests were carried out at a temperature of 80° C. The silicone oil degradation is monitored by the degree of conversion (DC) of the oil, expressed as mole %.

TABLE 2

| Catalyst | mol % | Reaction time (h) | Degree of conversion BGE (%) | Yld α and β hydroxy acrylate (%) | Yld Butoxy-ol (%) | Silicone degradation DC (%) |
|---|---|---|---|---|---|---|
| Cr(OAc)$_3$ | 1 | 8 | 100 | 92 | 4.4 | No |
| Fe(acrylate)$_3$ | 3 | 3 | 99 | 95.7 | 3.9 | No |
| Fe(acrylate)$_3$ | 1.5 | 8 | 99.8 | 97.3 | 5.9 | No |
| Fe(OCH$_2$CH$_3$)$_3$ | 3 | 3 | 99 | 95 | 4 | No |
| Fe(valerate)$_3$ | 3 | 3 | 99.5 | 95 | 3.8 | No |
| Fe(2-EH)$_3$ | 3 | 3 | 98.6 | 94.4 | 4.2 | No |
| Fe(stearate)$_3$ | 3 | 3 | 99.3 | 95 | 4 | No |
| Fe(benzoate)$_3$ | 3 | 3 | 99.3 | 94 | 4 | No |
| Fe(pivalate)$_3$ | 3 | 3 | 99.3 | 96 | 3 | No |
| Fe(neononanoate)$_3$ | 3 | 5 | 99 | 95 | 4.3 | No |
| Fe(ND)$_3$ | 3 | 4.25 | 98.7 | 97.1 | 4.4 | No |
| Fe(naphthenate)$_3$ | 3 | 5 | 99.5 | 92 | 6.5 | No |
| Fe(TFA)$_3$ | 3 | 4.5 | 99.4 | 82.6 | 4.4 | No |
| Fe$_2$O$_3$ | 3 | 8 | 11 | 5.4 | 12.9 | No |
| Fe | 3 | 5 | 17 | 5 | 12 | No |
| Fe(OH)$_3$ | 3 | 8 | 80.3 | 73.2 | 9.6 | No |
| Anhydrous FeCl$_3$ | 3 | 3.5 | 99.5 | 60.2 | 29.8 | Yes (5%) |
| FeCl$_3$·6H$_2$O | 3 | 3 | 98.7 | 69.1 | 19.5 | Yes (5%) |
| Fe(acac)$_3$ | 3 | 4 | 77.2 | 76.4 | 6.8 | No |

The various iron carboxylates ally good reaction kinetics, yields comparable to those obtained with the chromium acetate and often a better selectivity than in the case of chromium. Furthermore, no silicone oil degradation is noted. For example, with iron(III) acrylate, 15 mol % compared with 1 mol % is obtained with kinetics comparable to those of the chromium acetate, using a slightly higher catalyst concentration. The amounts of by-products are comparable.

The iron ethoxide also makes it possible to obtain very satisfactory results.

Some iron compounds generate other by-products (not described in the table), such as iron trifluoroacetate, the trifluoroacetate ligands of which are transferred on to the epoxide and cause instability of the products formed, or such as iron trichloride which not only generates chlorohydrins and a considerable amount of butoxy-ol, but also degrades the silicone oil.

The iron oxide and hydroxide exhibit low reactivity and the amount of "butoxy-ol" formed is considerable.

The iron acetylacetonate results in quite a selective reaction, even though the reactivity is a little lower than that obtained with the iron carboxylates.

Another series of tests was carried out with a second model reaction with the same procedure, but by decreasing the concentration of butyl glycidyl ether and the contents of solvent in order to mimic a longer silicone oil less rich in epoxide functions. The reagents used are the following:

1.18 grams of butyl glycidyl ether (BGE) at 95% purity,
8 grams of octamethyltrisiloxane,
0.94 gram of acrylic acid at 99% purity,
1.36 grams of MIBK,
1.6 grams of 1-butanol,
10 mg of 4-methoxyphenol, and
the corresponding amount of catalyst (see table 3).

The results are presented in table 3 below. The amount of catalyst is expressed as mole % relative to the butyl glycidyl ether (BGE). The degrees of conversion and yields (Yld) are indicated as mole % relative to the BGE. All the tests were carried out at a temperature of 90° C. The silicone oil degradation is monitored by the degree of conversion (DC) of the oil, expressed as mole %.

100 g of a polydimethylsiloxane oil H with a dynamic viscosity at 25° C. of 250 mPa·s. This oil contains, per molecule, 7 siloxyl units comprising a hydrocarbon-based group Y comprising an epoxy group, and Y is the hydrocarbon-based group (R-4) of formula below:

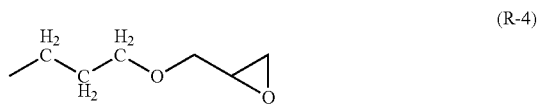

(R-4)

The weight percentage of the groups Y in the oil H is 10.5% and the molar content of epoxy in the oil H is 95.3 mmol per 100 g.

10.41 g of acrylic acid, that is to say 144 mmol,
15 g of methyl isobutyl ketone (MIBK),
18 g of 1-butanol,
0.08 g of methylhydroquinone, and
the catalyst of which the content is expressed as mole % relative to the epoxide functions (see table 4).

The stirring is adjusted to 1000 rpm, then the jacket of the reaction vessel is heated to the desired temperature while a gentle flow rate of air is maintained. Samples are taken over time in order to measure the degree of conversion of the epoxides. When a degree greater than 96% is obtained, the mixture is devolatilized under vacuum (gradually up to 1 mbar) while at the same time maintaining slight bubbling of air. After cooling, the oil obtained is filtered under pressure through a cellulose filter. The acrylate functions are quantitatively determined by $^1$H NMR at 85 mmol/100 g.

The results are presented in table 4 below.

TABLE 4

| Catalyst | mol % | T (° C.) | Reaction time (h) | Degree of conversion epoxide (%) |
|---|---|---|---|---|
| Cr(OAc)$_3$ | 1 | 90 | 4.75 | 99 |
| Fe(acrylate)$_3$ | 2 | 90 | 5 | 97 |

TABLE 3

| Catalyst | mol % | Reaction time (h) | Degree of conversion BGE (%) | Yld α and β hydroxy acrylate (%) | Yld Butoxy-ol (%) | Silicone degradation DC (%) |
|---|---|---|---|---|---|---|
| Cr(OAc)$_3$ | 1 | 5 | 100 | 93 | 3 | No |
| Fe(acrylate)$_3$ | 2 | 5 | 99.3 | 92 | 4.4 | No |
| Fe(OCH$_2$CH$_3$)$_3$ | 2 | 5 | 98.4 | 92 | 4.9 | No |
| Fe(OBu)$_3$ | 2 | 6 | 96 | 91 | 5 | No |
| Fe(pivalate)$_3$ | 2 | 5 | 99.5 | 93 | 4.4 | No |
| Fe(neononanoate)$_3$ | 2 | 5 | 97.3 | 91 | 5 | No |
| Fe(ND)$_3$ | 2 | 5 | 98 | 91 | 5 | No |
| Fe(stearate)$_3$ | 2 | 5 | 99.6 | 93 | 4.3 | No |
| Fe(naphthenate)$_3$ | 2 | 5 | 99 | 90 | 8 | No |

2. Test for Production of Organopolysiloxane Comprising an Acrylate Function

The following are loaded, with stirring, to a 250 ml reaction vessel equipped with a mechanical stirrer having a spindle that has 4 inclined blades, with a condenser, with an air inlet at the level of the blades and with a thermometric sheath:

These tests show that the iron(III) acrylate is an efficient catalyst for producing organopolysiloxanes comprising an acrylate function according to the process of the invention.

A second series of tests was carried out at 105° C. according to the same procedure while slightly varying the amounts of reagents:

101 g of a polydimethylsiloxane oil H as defined previously, 10.5 g of acrylic acid,
10.6 g of methyl isobutyl ketone (MIBK),
12.7 g of n-butanol,
0.08 g of methylhydroquinone, and
the catalyst of which the content is expressed as mole % relative to the epoxy functions.

The results are presented in table 5 below.

TABLE 5

| Test No. | Catalyst | mol % | T (° C.) | Reaction time | Degree of conversion epoxide (%) |
|---|---|---|---|---|---|
| A | Cr(OAc)₃ | 0.5 | 105 | 3 h 15 | 99.3 |
| B | Fe(acrylate)₃ | 1.5 | 105 | 6 h 20 | 98 |
| C | Fe(ND)₃ | 1.5 | 105 | 4 h 15 | 99.9 |
| D | Fe(OEt)3 | 1.5 | 105 | 7 h | 96 |
| E | Fe(OEt)3 | 1.5 | 115 | 3 h 15 | 99 |

The two iron(III) carboxylates and the iron(III) alkoxide tested make it possible to obtain a reaction time compatible with industrial production.

3. Tests for Producing a Release Coating on a Flexible Support 1 g of a radical photoinitiator (Tego® A18, sold by the company Evonik) is added to 99 g of polyorganosiloxane comprising an acrylate function A, B, or C obtained previously (see table 5) and the formulations A1, B1 and C1 are obtained. Each of these formulations A1, B1 and C1 is coated on a Lumirror® 60-21/36 PET film from the company Toray with a depositing rate of between 0.9 and 1 g/m². The samples of coated PET (PET(A1), PET(B1) and PET (C1)) are crosslinked using a UV lamp with a power of 100 W/cm. The speed at which the coated samples pass under the UV lamp is 50 m/min.

The quality of the polymerization was evaluated for the three samples (PET(A1), PET(B1) and PET(C1)) by means of a rub-off test which makes it possible to check the ability of the silicone formulation to adhere on the flexible support by scrubbing with back and forward movements of the finger. This application test is graded from 1, the worst result, to 10, the best result. A value of 10 was obtained for the three examples.

The three coated PET samples were subjected to an application test in order to evaluate their release via a measurement of the peeling forces. For this, the three samples were brought into contact with a standardized TESA® 7475 adhesive under the required pressure conditions for 1 day at ambient temperature and 1 and 7 days at 70° C. according to FINAT standard 11. Table 6 below presents the detachment forces measured in cN/inch.

TABLE 6

| Detachment force (cN/inch) | PET (A1) | PET (B1) | PET (C1) |
|---|---|---|---|
| 1 day at 23° C. | 10 | 10 | 12 |
| 1 day at 70° C. | 11 | 12 | 12 |
| 7 days at 70° C. | 15 | 17 | 16 |

The three samples exhibit very good release performance levels and no difference is observed between the three. Consequently, the process according to the invention makes it possible to obtain organopolysiloxanes functionalized with acrylate groups, without using chromium-based catalysts, that can be used successfully in the release application.

The invention claimed is:

1. A process for producing an organopolysiloxane A comprising at least one (meth)acrylate group, said process comprising:
a) the following are reacted at a temperature of between 50 and 140° C.:
at least one organopolysiloxane B comprising at least one epoxy group,
with acrylic acid or methacrylic acid or a mixture of the two,
in the presence of a catalyst C which is a complex of iron in the oxidation state (III), of formula (1) below:

[Fe(L¹)₃]　　(1)

in which the symbols L¹, which may be identical or different, represent a ligand chosen from the group made up of: a β-dicarbonylato anion or the enolate anion of a β-dicarbonyl compound, a carboxylate anion and an alkoxide anion, and
of at least one solvent, and
b) the product obtained, which is said organopolysiloxane A or a mixture containing predominantly said organopolysiloxane A, is isolated.

2. The process as claimed in claim 1, wherein the catalyst C is a complex of iron in the oxidation state (III), of formula (1) below:

[Fe(L¹)₃]　　(1)

in which the symbols L¹, which may be identical or different, represent a ligand chosen from the group made up of a carboxylate anion and an alkoxide anion.

3. The process as claimed in claim 2, wherein the catalyst C is an iron(III) carboxylate of formula (1) in which the symbols L¹ are ligands, which may be identical or different, chosen from the group of carboxylate anions, having from 1 to 40 carbon atoms.

4. The process as claimed in claim 1, wherein the catalyst C is an iron(III) alkoxide of formula (3) below:

Fe(OC$_n$H$_{(2n+1)}$)₃　　(3)

in which n is between 2 and 6.

5. The process as claimed in claim 1, wherein the organopolysiloxane B comprises siloxyl units (I.4) and (I.5) having the formulae below:

$$Y_a Z^1_b SiO_{\frac{4-(a+b)}{2}} \text{ and} \quad (I.4)$$

$$Z^2_c SiO_{\frac{4-c}{2}} \quad (I.5)$$

in which:
a=1 or 2, b=0, 1 or 2 and a+b=1, 2 or 3,
c=1, 2 or 3,
the symbols Y, which may be identical or different, represent a hydrocarbon-based group comprising an epoxy group and optionally also comprising one or more heteroatoms;
the symbols Z¹ and Z², which may be identical or different, represent a monovalent hydrocarbon-based group having from 1 to 30 carbon atoms, and
said organopolysiloxane B comprises, per molecule, at least two silicon atoms and at least one siloxyl unit (I.4).

6. The process as claimed in claim 5, wherein, for the siloxyl unit (I.4), the symbol Y is chosen from the group made up of the hydrocarbon-based groups (R-1) to (R-6) having the formulae below:

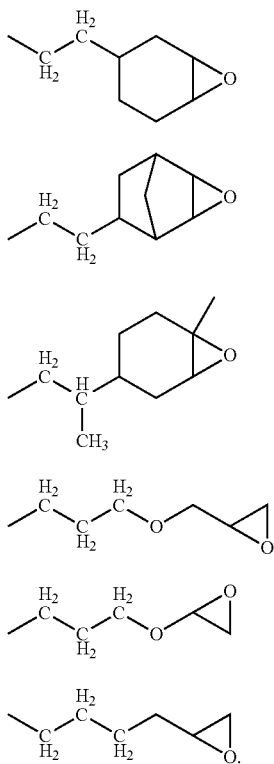

(R-1)

(R-2)

(R-3)

(R-4)

(R-5)

(R-6)

7. The process as claimed in claim 1, wherein the organopolysiloxane B contains from 1% to 60% by weight of hydrocarbon-based groups Y comprising an epoxy group.

8. The process as claimed in claim 1, wherein, in a), the solvent is a solvent S1 which is a primary alcohol comprising from 2 to 6 carbon atoms.

9. The process as claimed in claim 8, wherein a) is carried out in the presence of a second solvent S2 chosen from the group made up of methyl isobutyl ketone, methyl ethyl ketone, toluene, xylene, chlorobenzene and mixtures thereof.

10. A process for producing a coating on a substrate, comprising:
   a. an organopolysiloxane A is produced according to the process of claim 1,
   b. a radical-crosslinkable silicone composition W is produced by adding, to said organopolysiloxane A;
      i. a photoinitiator, and
      ii. optionally at least one additive,
   c. said composition W is applied on a substrate, and
   d. said composition W is crosslinked by exposure to radiation.

11. The process as claimed in claim 10, wherein the radiation is ultraviolet light.

12. The process as claimed in claim 10, wherein the crosslinking d) is carried out at a temperature of between 40 and 100° C.

13. The process as claimed in claim 10, wherein the substrate is made of textile, of paper, of polyvinyl chloride, of polyester, of polypropylene, of polyamide, of polyethylene, of polyethylene terephthalate, of polyurethane or of nonwoven glass fibers.

14. The process as claimed in claim 1, wherein the organopolysiloxane B contains from 1% to 15% by weight of hydrocarbon-based groups Y comprising an epoxy group.

15. The process as claimed in claim 1, where the reaction is at a temperature of between 70 and 130° C.

16. The process as claimed in claim 1, wherein the organopolysiloxane B comprises siloxyl units (I.4) and (I.5) having the formulae below:

$$Y_a Z^1_b SiO_{\frac{4-(a+b)}{2}} \text{ and} \tag{I.4}$$

$$Z^2_c SiO_{\frac{4-c}{2}} \tag{I.5}$$

in which:
a=1 or 2, b=0, 1 or 2 and a+b=1, 2 or 3,
c=1,2 or 3,
Y is chosen from the group made up of an alkyl glycidyl ether, a linear, branched or cyclic epoxy alkyl, a linear, branched or cyclic epoxy alkenyl and a carboxylic acid glycidyl ester;
the symbols $Z^1$ and $Z^2$, which may be identical or different are chosen from the group made up of a methyl, ethyl, propyl, 3,3,3-trifluoropropyl, xylyl, tolyl and phenyl group, and
said organopolysiloxane B comprises, per molecule, at least two silicon atoms and at least one siloxyl unit (I.4).

* * * * *